Figure 1:
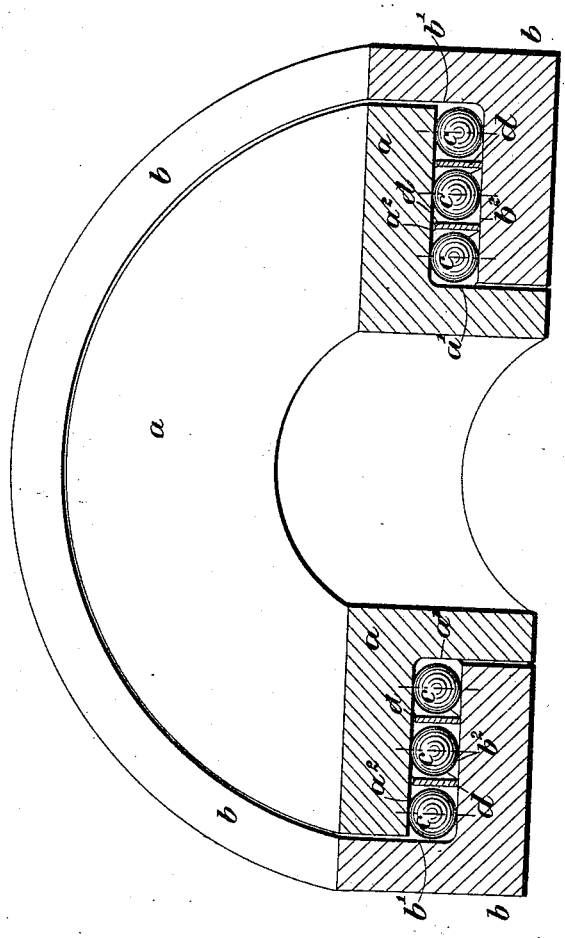

(No Model.)  3 Sheets—Sheet 1.

G. F. SIMONDS.
BALL BEARING.

No. 434,474. Patented Aug. 19, 1890.

Witnesses:
J. A. Rutherford.
Percy B. Hills.

Inventor:
George F. Simonds
By James L. Norris.
Attorney (No Model.)  3 Sheets—Sheet 2.

G. F. SIMONDS.
BALL BEARING.

No. 434,474.  Patented Aug. 19, 1890.

Witnesses:
J. A. Rutherford.
Percy B. Hills.

Inventor:
George F. Simonds.
By James L. Norris.
Attorney (No Model.)  3 Sheets—Sheet 3.

G. F. SIMONDS.
BALL BEARING.

No. 434,474. Patented Aug. 19, 1890.

Witnesses:
J. A. Rutherford.
Leroy B. Hills.

Inventor:
George F. Simonds.
By James L. Norris.
Attorney.

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,474, dated August 19, 1890.

Application filed January 2, 1890. Serial No. 335,694. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to bearings in which circular series or groups of spherical rollers or balls are employed to diminish the friction.

The object of my said invention is to provide an improved bearing for resisting or transmitting the thrust or end pressure of screw-propeller and other shafts and for supporting turn-tables and other revolving parts of machinery; and my said invention is very advantageous in cases where a single circular series or group of balls is not sufficient for the purpose.

My said invention comprises a bearing in which two or more concentric series or groups of balls are arranged between a plane bearing-surface on the rotating part and a plane bearing-surface on the stationary or non-rotating part.

My said invention also comprises the combination, with the concentric series or groups of balls, of suitable hoops arranged between the said series or groups of balls for the purpose of separating the balls of one series or group from those of an adjacent series or group. I find it advantageous to arrange the said series or groups of balls between two rings or annular pieces of steel or other suitable material which are provided with plane bearing-surfaces for the balls and with concentric surfaces which retain the balls in place, but do not serve as bearing-surfaces, each of the said rings or annular pieces having formed thereon one of the said concentric surfaces and one of the said plane surfaces. I sometimes combine with a bearing provided with concentric series or groups of balls, as above mentioned, one or more series of spherical rollers or balls arranged between concentric bearing-surfaces for the purpose of supporting a horizontal shaft or resisting lateral movement of a vertical shaft or other rotating body.

In the accompanying drawings I have shown how my said invention may be conveniently and advantageously carried into practice.

Figure 2:
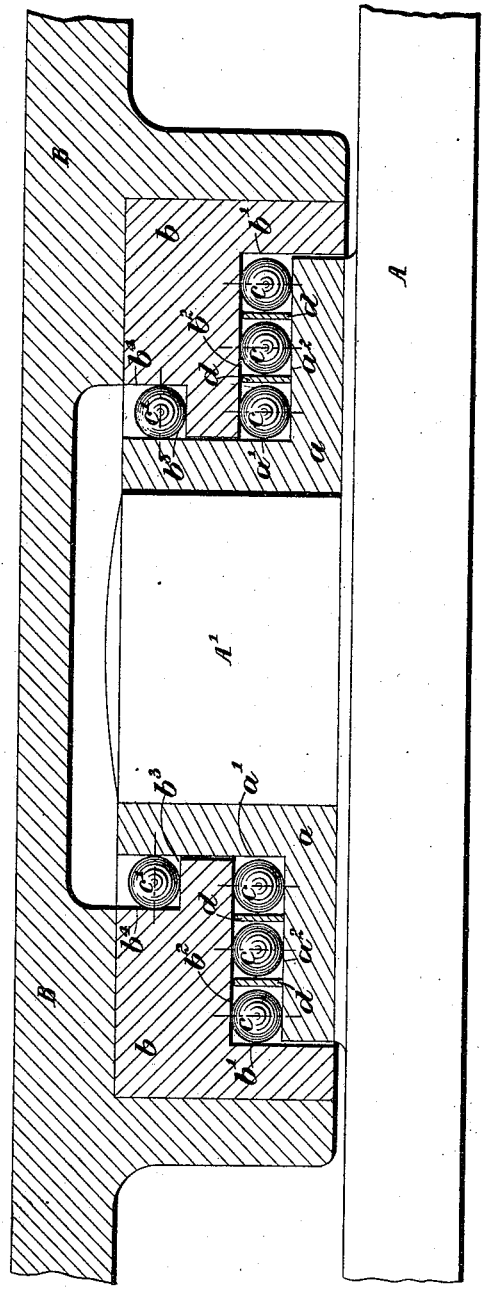
Figure 3:
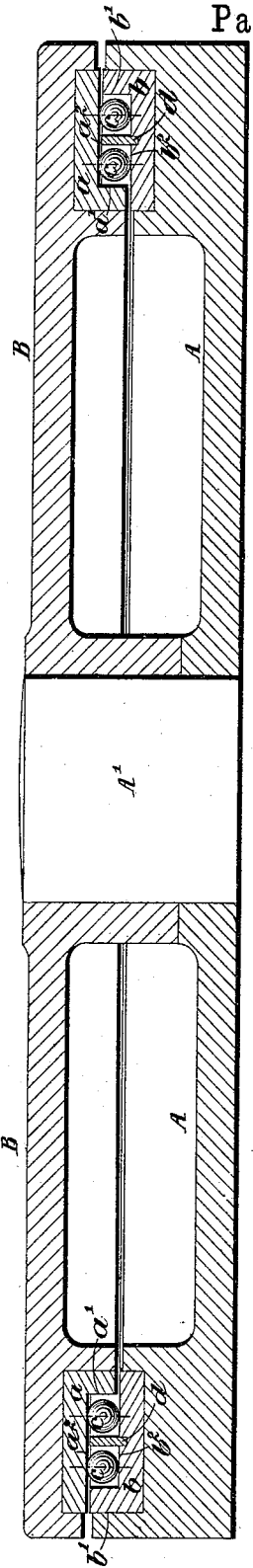

Figure 1 is a sectional perspective view of a pair of rings or annular pieces having concentric series or groups of balls arranged between them according to my present invention. Fig. 2 is a side elevation, partly in vertical central section, illustrating one form of my improved bearing adapted for a turn-table or similar rotating piece of machinery. Fig. 3 is a vertical central section of another form or modification of my improved bearing adapted for supporting a turn-table or the like.

$a\ b$ are the inner and outer rings or annular pieces, which are formed with concentric surfaces $a'\ b'$ and with plane bearing-surfaces $a^2\ b^2$, parallel to each other and perpendicular to the said concentric surfaces.

$c\ c$ are the spherical rollers or balls, which are arranged in concentric series or groups in the annular channel or cavity formed between the two rings $a\ b$. The direction of the pressure upon the balls $c\ c$ is indicated more clearly by dotted lines passing through the points of contact of the balls with the said surfaces.

$d\ d$ are hoops placed between the series or groups of balls for the purpose of separating the same.

In Fig. 1 I have shown a single pair of rings or annular pieces $a\ b$, with three concentric series or groups of balls $c$ between them, the said series or groups of balls being separated from each other by hoops $d$. Any desired number of such pairs of rings of the required diameter, with balls between them, may be used in a thrust or end pressure bearing, or in a bearing for supporting a vertical shaft or a turn-table or other rotating body, or for analogous purposes.

In the bearing shown in Fig. 2 one pair of rings $a\ b$, with three concentric series or groups of balls $c$ between them, is employed, hoops $d$ being arranged between the said series or groups of balls to separate them from each other. The inner ring $a$ is extended upward, and the outer ring $b$ is provided with a circular recess or channel $b^3$, in which is arranged a circular series or group of balls $c'$. These balls bear against the concentric surface $a'$ of the ring $a$ and against a concentric surface $b^4$ on the ring $b$, and thus prevent lateral movement of the rotating part relatively to the stationary or non-rotating part. The inner ring $a$ is fixed upon a stud or pivot-pin $A'$, formed on or fixed in a base-plate A. The outer ring $b$ is fitted and secured in a suitable recess or cavity in the under side of a turn-table B or other rotating body.

In Fig. 3 I have shown a bearing for supporting a turn-table or similar rotating structure. In this bearing the rings $a$ and $b$ are made in sections. The ring $a$ is fitted in a recess or cavity in a turn-table B, and the ring $b$ is fitted in a recess or cavity in the base-plate A. Two concentric series or groups of balls $c$, with a hoop $d$ between them, are employed in this bearing. The hoop $d$ may advantageously be formed in sections and fitted into a groove or recess in the ring $b$, as shown. The turn-table B is arranged to rotate about a central pivot $A'$, fixed in the base-plate A, and the balls $c$ serve to support the said turn-table at or near its periphery.

It is obvious that various other forms of bearings can be constructed in accordance with my said invention with concentric series or groups of balls between plane surfaces on the rotating and non-rotating parts.

Certain features of construction shown and described, but not claimed, in this application, are shown, described, and claimed in application Serial No. 331,639, filed by me.

Having fully described my invention, what I desire to claim, and secure by Letters Patent, is—

1. In a ball-bearing, the combination, with two rings or annular pieces each provided with a plane bearing-surface for the balls and with a concentric surface for retaining the said balls in place, of concentric series or groups of balls arranged between the said plane surfaces, and hoops for separating the balls of one series from those of another series, substantially as and for the purposes set forth.

2. The combination of a rotating body provided with a plane surface, a stationary or non-rotating body provided with a plane surface parallel thereto, concentric series or groups of balls arranged between the said plane surfaces, and a circular series or group of balls arranged between a concentric surface on the rotating body and a concentric surface on the stationary or non-rotating body, substantially as and for the purposes set forth.

3. The combination, with inner and outer rings or annular pieces $a$ $b$ and concentric series or groups of balls $c$ arranged between the same, of hoops $d$, arranged between the series or groups of balls and fitted in recesses or grooves in one of the said rings, substantially as and for the purpose above specified.

4. The combination of the inner and outer rings or annular pieces $a$ $b$, having the concentric surfaces $a'$ $b'$ and the plane surfaces $a^2$ $b^2$, the balls $c$, arranged in concentric series or groups in the channel or cavity formed by the said surfaces, and the hoops $d$, for separating the balls of one series from those of another series, substantially as and for the purposes set forth.

5. The combination of the inner and outer rings or annular pieces $a$ $b$, provided with concentric and plane surfaces, concentric series or groups of balls $c$, arranged between the said plane surfaces, hoops $d$, arranged between the said concentric series or groups of balls, and a series of balls $c'$, arranged between the concentric surfaces $a'$ $b^4$ on the said rings $a$ $b$, substantially as and for the purposes set forth.

6. The combination of the base-plate A, provided with the stud or pivot-pin $A'$, the turn-table or rotating body B, the ring or annular piece $a$, carried by the said base-plate and formed with the concentric surface $a'$ and with the plane surface $a^2$, the ring or annular piece $b$, secured to the said turn-table or other rotating body and formed with the concentric surface $b'$ and with the plane surface $b^2$, concentric series or groups of balls $c$, arranged between the said rings or annular pieces, and hoops $d$, separating the balls of one series from those of another series, substantially as and for the purposes set forth.

7. The combination of the base-plate A, provided with the stud or pivot-pin $A'$, the turn-table or other rotating body B, the ring or annular piece $a$, fixed upon the said stud or pivot pin and formed with the concentric surface $a'$ and with the plane surface $a^2$ perpendicular thereto, the ring or annular piece $b$, secured to the under side of the said turn-table or other rotating body and formed with the concentric surfaces $b'$ $b^4$ and with the plane surface $b^2$ perpendicular thereto, concentric series or groups of balls $c$, arranged between the said plane surfaces $a^2$ $b^2$, hoops $d$, separating the balls of one series from those of another series, and a circular series or group of balls $c'$, arranged between the concentric surfaces $a'$ $b^4$, all substantially as and for the purposes set forth.

In testimony whereof I have hereunto signed my name in the presence of two subscribing witnesses.

GEORGE FREDERICK SIMONDS.

Witnesses:
DAVID YOUNG,
CHAS. B. BURDON.